United States Patent
Schief

[15] 3,662,159
[45] May 9, 1972

[54] METHOD OF DIGITALLY COMPUTING THE SQUARE OF THE RATIO OF A VARIABLE MEASURING FREQUENCY TO A CONSTANT BASE FREQUENCY

[72] Inventor: Alfred Schief, Karlsruhe, Germany
[73] Assignee: August Sauter KG, Ebingen, Germany
[22] Filed: Sept. 9, 1970
[21] Appl. No.: 70,699

[30] Foreign Application Priority Data

Sept. 19, 1969 Germany..................P 19 47 605.2

[52] U.S. Cl..................235/150.3, 235/92 FQ, 235/92 CC, 73/67.2, 177/210, 177/1
[51] Int. Cl...........................................................G06f 7/46
[58] Field of Search..............73/67.2, 67; 177/210; 177/1; 235/151.33, 150.3, 156, 152, 160, 92 CC, 92 DM, 92 EV, 92 PE, 92 Q; 328/144

[56] References Cited

UNITED STATES PATENTS

| | | | |
|---|---|---|---|
| 3,366,191 | 1/1968 | Reid et al. | 177/210 |
| 3,565,193 | 2/1971 | Wirth | 73/67.2 X |
| 3,557,348 | 1/1971 | Aemmer | 235/150.3 |

Primary Examiner—Malcolm A. Morrison
Assistant Examiner—Edward J. Wise
Attorney—Ernest F. Marmorek

[57] ABSTRACT

A method of digitally computing the square of the ratio of a variable measuring frequency $f_x$ to a constant base frequency $f_{xo}$ using a constant reference frequency $f_o$, especially in measuring weights on a string-type scale by employing a measuring counter, a base time counter and a control counter, comprising the steps of simultaneously with the initiating of the counting operation producing a series of electrical pulses $I_x$ with a frequency $F_x$ proportional to the signal frequency $f_x$, feeding this series of pulses to the measuring counter for a counting period comprising two counting phases the first one of which is set by the base time counter, producing a series of electrical reference pulses $I_o$ with a frequency $F_o$ proportion to the base frequency $f_{xo}$, feeding the reference pulses $I_o$ in excess of pulses $I_x$ to the control counter which sets the second one of the counting phases, the measuring frequency $f_x$ after the beginning of the counting is fed to the measuring counter M over a first AND gate U1 and over a second AND gate U2 to an input V of the control counter S also having a second input R, the reference frequency $f_o$ being fed to the second input R over a third AND gate U3, and also over a fourth AND gate U4 to the base time counter G which counts from zero up to a predetermined number and thereby sets the period T2 of the first counting phase during which an output signal of the base time counter is fed into the second and fourth AND gates U2, U4, such output signal keeping the second and fourth AND gates open during the first phase, the control counter S attaining a count during the fist counting phase which during the second counting phase determined by the time period T2 of the control counter S is reduced by the reference frequency $f_o$ to zero and, at the end of such time period T2 the first AND gate U1 becomes closed which has been kept open till the end of such time period T2 by an output signal of the control counter S.

7 Claims, 1 Drawing Figure

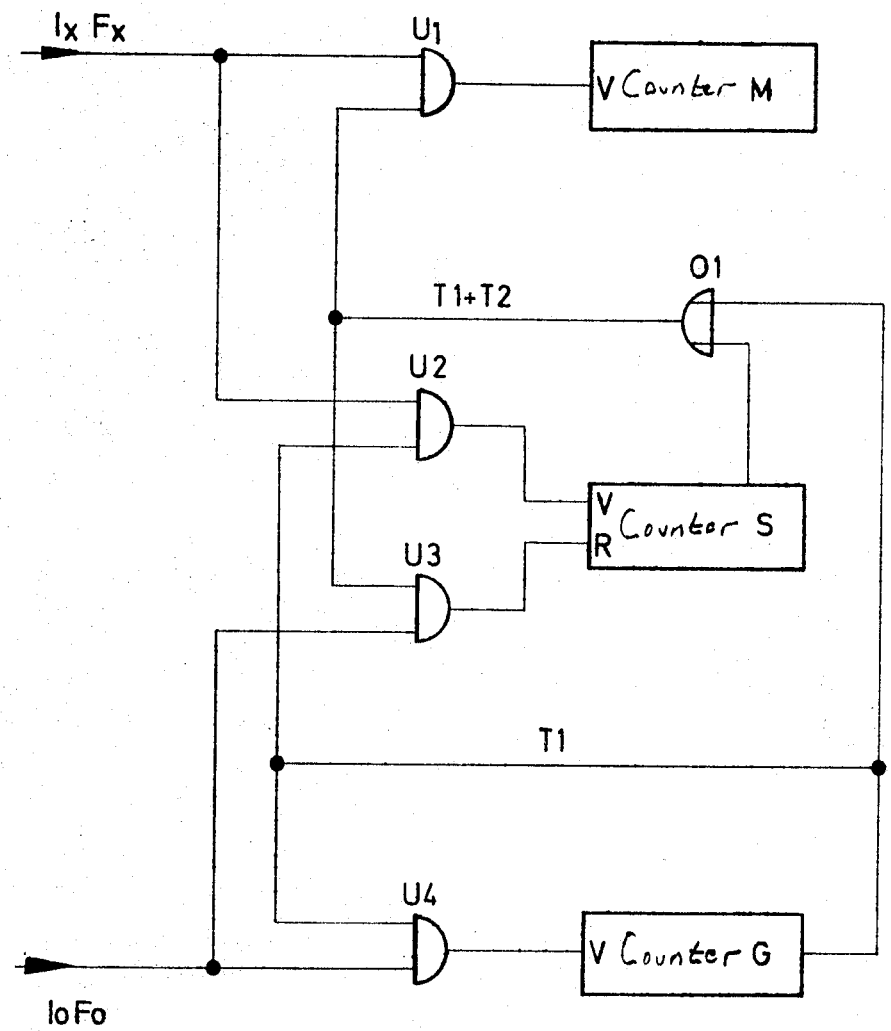

METHOD OF DIGITALLY COMPUTING THE SQUARE OF THE RATIO OF A VARIABLE MEASURING FREQUENCY TO A CONSTANT BASE FREQUENCY

FIELD OF THE INVENTION

The present invention relates to a method of digitally computing the square of the ratio of a variable measuring frequency $f_x$ to a constant base frequency $f_{xo}$ by using a constant reference frequency $f_o$, especially for weight measuring on string-type measuring scales.

CROSS-REFERENCE TO OTHER APPLICATIONS

Reference is made to copending U.S. Pat. application Ser. No. 788,844 filed Jan. 3, 1969 by Walter Wirth and assigned to the same assignee as the present application.

The above referenced co-pending application relates also to a method of digitally computing the square of the ratio of a variable measuring frequency $f_x$ to a constant base frequency $f_{xo}$ by using a constant reference frequency $f_o$, especially for weight measuring on string-type scales, and in which three counters comprising a measuring counter, a base time counter and a control counter are present and wherein the counting operation is simultaneously started by all counters with the production of a series of electrical pulses $I_x$ having a measuring pulse frequency $F_x$ proportional to the measuring frequency $f_x$ fed to the measuring counting means during the counting period consisting of two counting phases from which the first phase is set by the base time counter to which a series of electrical reference pulses $I_o$ having a reference pulse frequency $F_{xo}$ proportional to the base frequency $f_o$ is fed while the control counter simultaneously counts the excess number of pulses of the other pulse series and sets the second counting phase.

BACKGROUND OF THE INVENTION

On the basis of physical laws one frequently obtained in measurings a periodic signal of the frequency $f_x$ which is proportional to the root of a sought after physical magnitude X. The following relation holds then:

$$f_x = F_{xo} \sqrt{X}$$

in which $F_{xo}$ is a constant. In order to obtain a result directly proportional to the magnitude X which, for example, can be used for indication purposes, it is necessary to form the square of the frequency $f_x$. An example of such process is represented by the string-type scale in which the eigen-frequency of an oscillating string is proportional to the root of the force applied to tension the string. In this case the physical magnitude, for example, consists of a force biasing the string, while the weight on the scale which additionally tensions the string constitutes the measured magnitude. The constant $F_{xo}$ assumes, for instance, the numerical value of the measuring frequency $f_x$ obtained for the zero value of the measured magnitude.

The above-referenced co-pending application is based on the recognition that the result of counting a number by a series of events, such as pulses, serially and periodically related to the frequency $f_x$, is proportional to the frequency $f_x$ and to the counting time. In the event the counting time is made proportional to the frequency $f_x$, then the result is proportional to the square of the frequency $f_x$. The basic features of the method for digitally computing of such square value is described in the above mentioned co-pending application in which, there is also a proposition for the practical performance of such method. The practical application of the method proposed by the above-referenced co-pending application encountered, however, some difficulties in that it requires an extensive electronic equipment to practice.

SUMMARY OF THE INVENTION

It is, therefore, an object of the present invention to provide an improved method for the digital computing of the square of the ratio of a variable measuring frequency to a constant base frequency using a constant reference frequency, especially in measuring weights on a string-type scale, which method is more economical to practice than the hitherto available methods and requires a much more simplified equipment to practice.

According to the present invention after the beginning of the counting operation the measuring pulse frequency $F_x$ is fed over a first AND gate into a measuring counter and over a second AND gate to the input of a control counter having also a second input to which a reference pulse frequency $F_{xo}$ is fed over a third AND-gate, the reference pulse frequency $F_o$ being also fed over a fourth AND-gate into a base time counter which performs a counting from zero up to a predetermined number and sets the time period of the first counting phase during which the output signal of the base time counter is fed into the second and fourth AND-gates which are thereby kept open during such first counting phase, the control counter attaining a count during the first counting phase which during the second counting phase the time period of which is determined by the control counter means is reduced by the reference frequency $f_o$ to zero and, at the end of such time period the first AND-gate becomes closed, such first AND-gate having been kept open to the end of such time period by an output signal of the control counter means.

This method is simplified in its individual steps and consequently a simplified electronic equipment is required for its practice. In addition to the three counters which are required in every case there is also a need for four conventional AND-gates. It is noted that according to the present invention the practice of the present method does not require the frequency divider circuit which is otherwise required in the second counting phase according to the method taught by the above-referenced co-pending application.

The reference frequency $f_{xo}$ can be selected to correspond to that measuring frequency $f_{xo}$ which corresponds to the zero value of the measured magnitude.

As a result, special consideration of the scale operation can be given attention. The oscillator producing the measuring frequency and the oscillator producing the reference frequency can be under such circumstances, identically constructed. As a result, the aging, temperature, weight and oscillations of the base will effect both oscillators equally and cannot contribute or cause a distortion of the results of the measurement.

BRIEF DESCRIPTION OF THE DRAWING

The invention will become more readily apparent from the following description of a preferred embodiment thereof shown, by way of example, in the accompanying drawing, in which:

The single FIGURE is a schematic representation of the circuit according to the present invention employed in the digital computation of the square of the frequency ratios.

DESCRIPTION OF THE PREFERRED EMBODIMENT

At the beginning of the counting operation and also at the beginning of the measuring a voltage produced by a measuring oscillator or a corresponding measuring pulse frequency is fed over a AND-gate UI to a measuring counter M. A voltage produced by an auxiliary oscillator and having a fixed frequency or a corresponding fixed reference pulse frequency $F_o$ is fed over a AND-gate U4 to a base time counter G which at its output from the beginning of the measuring process delivers a signal until a predetermined number set by a period $Z_o$ is attained. The time required to attain such number is designated by T1 (first counting phase) and is defined by $$T1 = (Z_o)/(F_o)$$

The signal delivered by the output of the base time counter G is during, the time period T1, fed over a AND-gate U4 to the input of the base time counter G as well as over an OR-circuit O1 and over a AND-circuit U3 to the backward input R of a control counter S which is open for the reference frequency $F_o$. Simultaneously, the forward output V of the control counter S becomes open over a AND-gate U2 for the measuring frequency $F_x$. Assuming that $$F_x \geq F_o$$

Then we obtain in the control counter S at the end of the first counting phase, that is, at the end of time period T1, the following count:

$$ZS = T1 \cdot (F_x - F_o)$$

After termination of the period T1 the base time counter G will not deliver any more signals. The AND-gate U2 becomes closed also for the measuring frequency $F_x$ while the AND-gate U3 and, thereby, the backward input R of the control counter S remains further open for the reference frequency $F_o$ by a signal of the control counter S delivered through the OR-gate O1. The control counter S will deliver at its output a signal as long until the count in it again reaches zero. Since we assumed that $F_X \geq F_o$, then ZS is certainly not negative. There was, however, no guarantee at the beginning of the measuring that a counting takes place in the forward input V of the control counter S in the first instance. Therefore, in order to avoid an early closing of the AND-gate U3 because of a counting which took place first at the backward input R accompanied by a discontinuance of the output signal of the control counter S, an OR-circuit O1 is provided over which at the beginning of the measuring a uniform signal is fed from the output of base time counter G to the AND-gate U3. Simultaneously unambiguous relations are also created for the AND-gate U1 which is connected before the measuring counter M. As soon as the count in the control counter S reaches zero, there will be no more signal appearing at its output and the AND-gate U1 becomes closed. The time period T2, required to reduce the count ZS with the frequency $F_o$ (the second counting phase) is defined by $$T2 = ZS/F_o = T1/F_o (F_x - F_o) = T1 (F_x)/(F_o) - T1$$

At the input of the measuring counter M the measuring frequency $F_x'$ is fed over the AND-gate U1 during the entire period T1 plus T2, The attained count is defined by $$Z_m = (T1 + T2) \cdot F_x = T1 (F_x)/(F_o) F_x = (T1)/(F_o) \cdot F_x^2 = (Z_o)/F_{oah}^2) \cdot (F_x^2)$$

It is then proportional to the square of the frequency $F_x$ and thereby it is proportional to the magnitude X.

The required electronic equipment can be further simplified if instead of transforming the measuring frequency $f_x$ and the reference frequency $f_o$ into the pulse frequency $F_x$, $F_{ro}$, such frequencies $f_x$, $f_o$ are directly given into the circuit as voltages. The method in the last instance remains the same, however, two pulse transformers are spared.

From the above, it is apparent that although the invention has been described hereinbefore with respect to certain specific method thereof, it is evident that many modifications and changes may be made without departing from the spirit of the invention. Accordingly, by the appended claims, we intend to cover all such modifications and changes as fall within the true spirit and scope of this invention.

What is claimed is:

1. A method of digitally computing the square of the ratio of a variable measuring frequency $f_x$ to a constant base frequency $f_{ro}$ using a constant reference frequency $f_o$ in measuring weights on a string-type scale by employing three counter means comprising a measuring counter means, a base time counter means and a control counter means, comprising the steps of simultaneously with the initiating of the counting operation producing a series of electrical pulses $I_x$ with a frequency $F_x$ proportional to the signal frequency $f_x$, feeding this series of pulses to said measuring counting means for a counting period comprising two counting phases, producing a series of electrical reference pulses $I_o$ with a frequency $F_o$ proportional to the base frequency $f_{ro}$, feeding the reference pulses $I_o$ in excess of pulses $I_x$ to said control counter means, the first one of such counting phases being started by presetting said base time counter means, during the first counting phase the control counter means being fed with the measuring frequency $f_x$ at a forward input thereof and simultaneously with the reference frequency $f_o$ at a reverse input thereof, the measuring counter means being fed with the measuring frequency $f_x$ and the preset base time counter means being fed with the reference frequency $f_o$, the first counting phase being completed by said base time counter means upon reaching a zero position and a second counting phase being started, during said second counting phase said measuring counter means being fed further with the measuring frequency $f_x$, said control counter means being fed solely with said reference frequency $f_o$ at said reverse input thereof and completing said second counting phase upon reaching zero position, whereby the contents of said measuring counter means is proportional to the square of the measuring frequency.

2. The method as claimed in claim 1, wherein said control counting means, the measuring frequency pulse $f_x$ after the beginning of the counting is fed to the measuring counter means over a first AND gate and over a second AND gate to an input of said control counter means also having a second input, said reference frequency pulses $f_o$ being also fed over a fourth AND gate to the base time counter means, said base time counter means counting from zero up to a predetermined number and thereby setting the period T1 of said first counting phase during which an output signal of said base time counter means is fed into the second and fourth AND gates, said output signal keeping said second and fourth AND gates open during said first phase, said control counter means attaining a count during said first counting phase which during said second counting phase determined by the time period of said control counter means is reduced by said reference frequency pulses $f_o$ to zero and, at the end of such time period said first AND gate becomes closed, said first AND gate being kept open till the end of such time period by an output signal of said control counter means.

3. The method as claimed in claim 2, wherein said measuring frequency $f_x$ is fed over said second AND gate to a forward input of said control counter means.

4. The method as claimed in claim 2, wherein said reference frequency $f_o$ is fed over said third AND gate to a reverse input of said control counter means.

5. The method as claimed in claim 2, wherein said control counter means produces an output signal during the entire counting period TI + T2, said output signal keeping said first and third AND gates open.

6. The method as claimed in claim 2, wherein for the attaining of defined conditions for the starting of the counting operation, the output signals of said base time counter means and of said control counter means are fed over both inputs of an OR gate to said first and third AND gate.

7. The method as claimed in claim 1, wherein said reference frequency $f_o$ is selected to be equal to such measuring frequency $f_{ro}$ which corresponds to a zero magnitude of the measured unit.

* * * * *